May 6, 1924.  
W. S. HUFF  
1,493,344  
APPARATUS FOR DISPOSING WATER IN FIREPROOF TANKS  
Filed March 12, 1921  
4 Sheets-Sheet 1

WITNESSES

INVENTOR  
Wilson S. Huff,  
BY  
ATTORNEYS

May 6, 1924.

W. S. HUFF 1,493,344

APPARATUS FOR DISPOSING WATER IN FIREPROOF TANKS

Filed March 12, 1921      4 Sheets-Sheet 2

WITNESSES

INVENTOR
Wilson S. Huff,
BY
ATTORNEYS

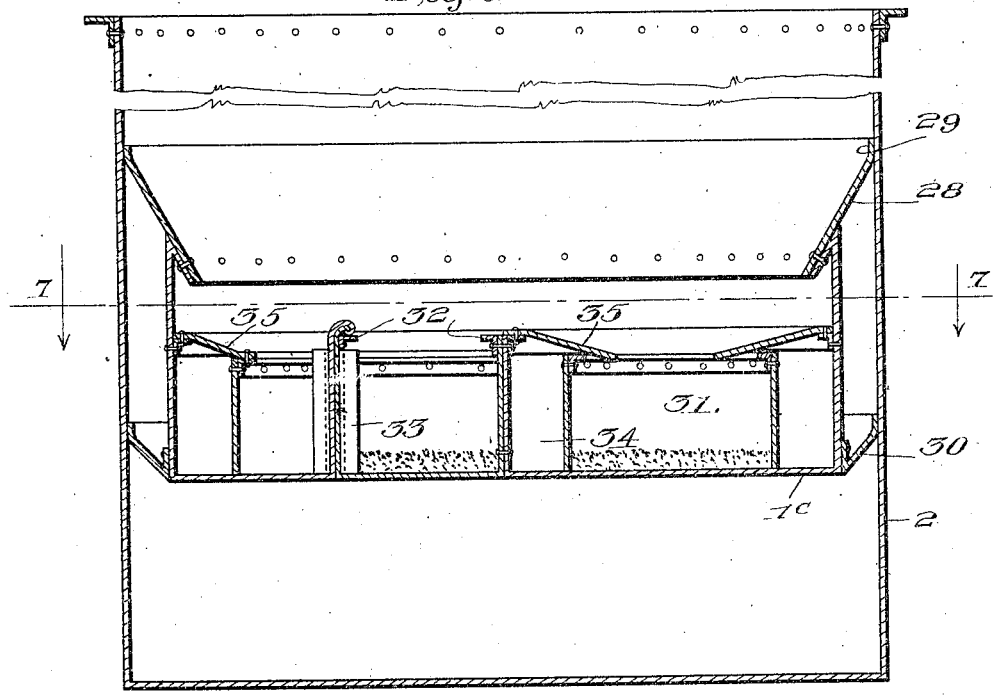
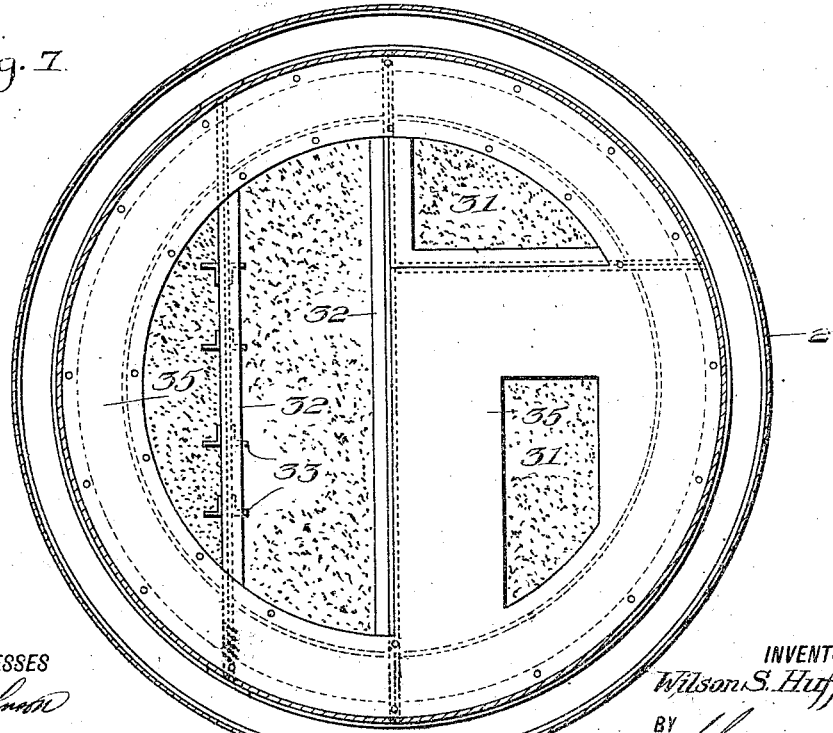

May 6, 1924.  
W. S. HUFF  
1,493,344  
APPARATUS FOR DISPOSING WATER IN FIREPROOF TANKS  
Filed March 12, 1921    4 Sheets-Sheet 4

WITNESSES  
INVENTOR  
Wilson S. Huff,  
BY  
ATTORNEYS

Patented May 6, 1924.

1,493,344

UNITED STATES PATENT OFFICE.

WILSON SYLVESTER HUFF, OF OKLAHOMA CITY, OKLAHOMA.

APPARATUS FOR DISPOSING WATER IN FIREPROOF TANKS.

Application filed March 12, 1921. Serial No. 451,873.

*To all whom it may concern:*

Be it known that I, WILSON SYLVESTER HUFF, a citizen of the United States, and a resident of Oklahoma City, in the county of Oklahoma and State of Oklahoma, have invented certain new and useful Improvements in Apparatus for Disposing Water in Fireproof Tanks, of which the following is a specification.

My invention relates to improvements in fire-proof tanks, and it consists in the constructions, combinations and mode of operation herein described and claimed.

One of the foremost objects of the invention is to provide a fire-proof tank for holding oil and other inflammable liquids, one of the principal features residing in the method of so disposing the water falling upon the floating tank which covers the surface of the liquid, that all danger of the floating tank tipping over to one side is obviated.

A further object of the invention is to provide a floating tank or cover for the surface of the liquid in a container, which includes means for disposing the water, falling thereupon, in a predetermined manner.

A still further object of the invention is to provide a floating tank, made up of either tanks or compartments formed in any desired manner, so as to provide containers for the water falling upon the floating tank and thus prevent any likelihood of the floating tank tipping dangerously to one side by virtue of an unbalanced accumulation of water.

Other objects and advantages will appear in the following specification, reference being had to the accompanying drawings, in which:—

Figure 1:
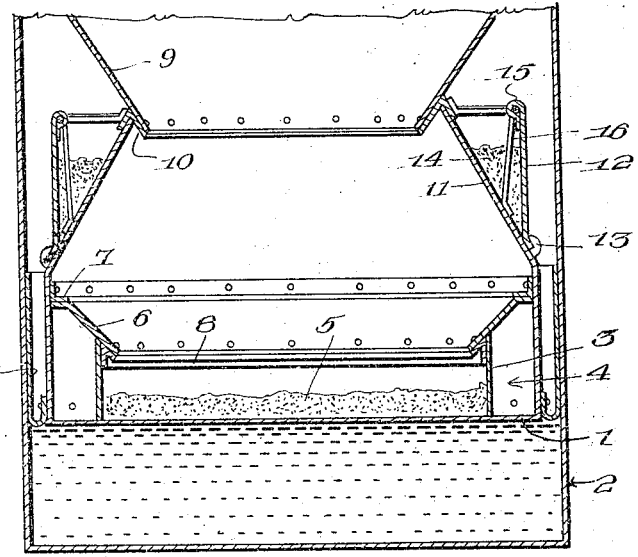
Figure 3:
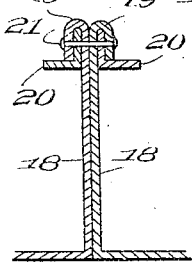
Figure 2:
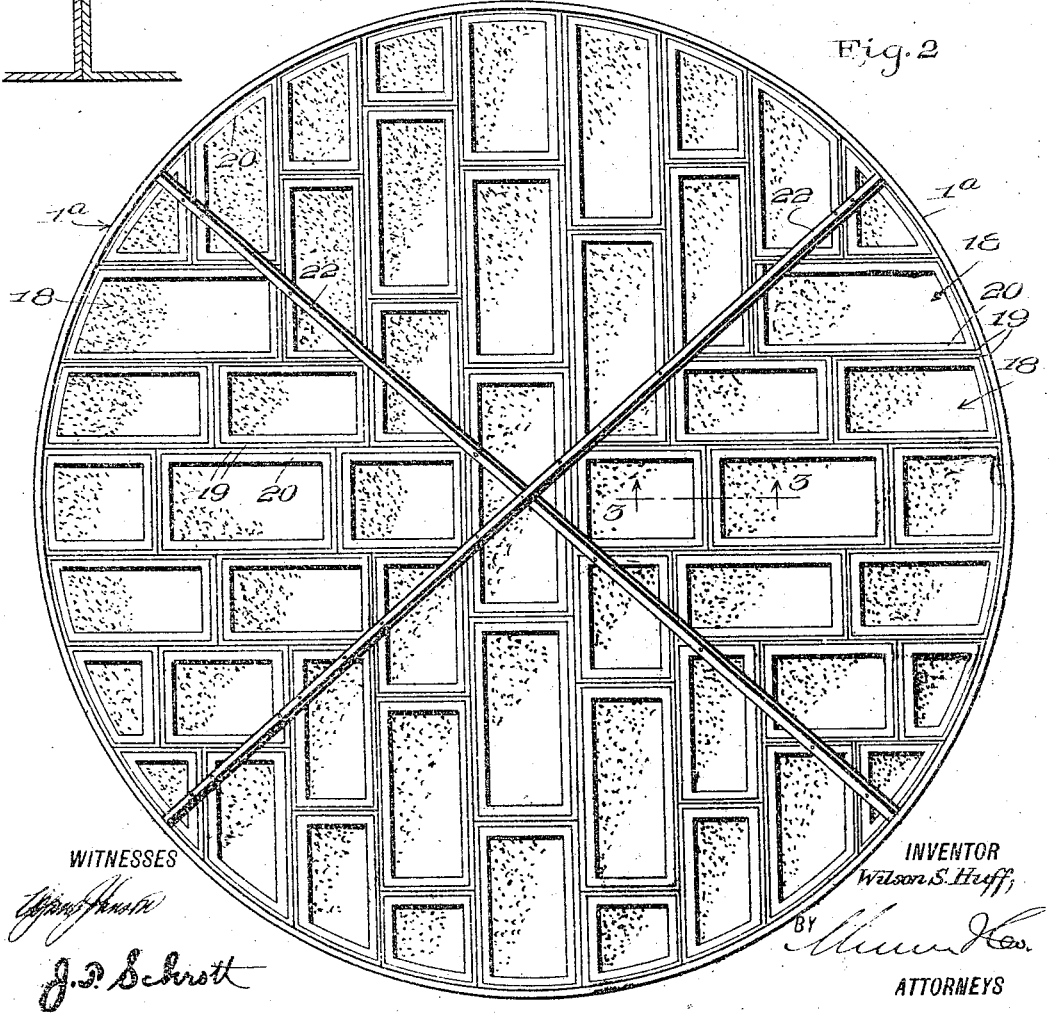
Figure 4:
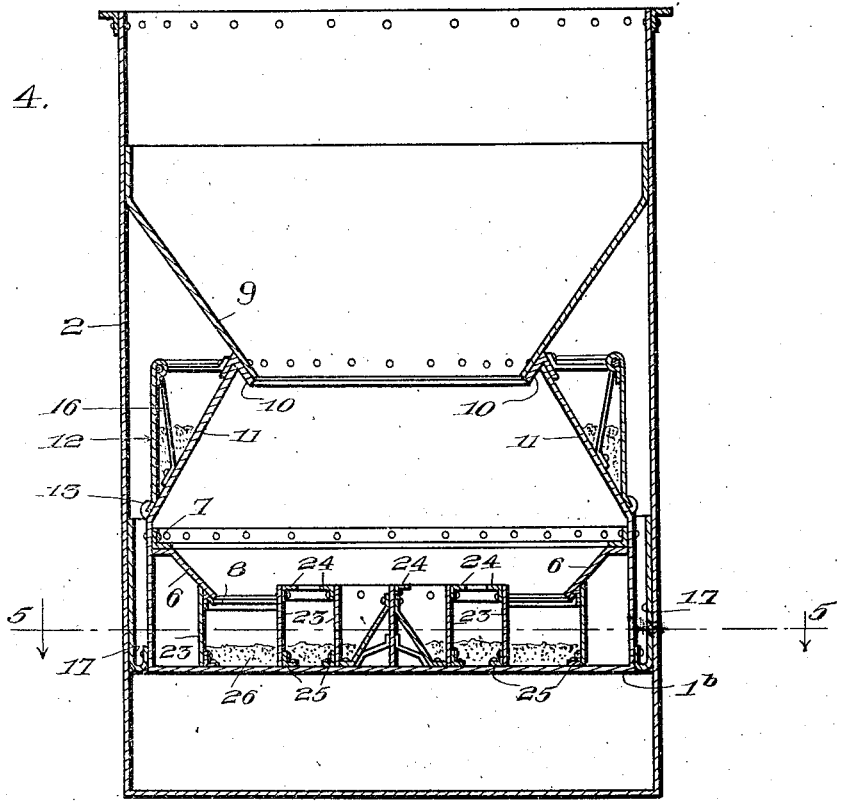
Figure 5:
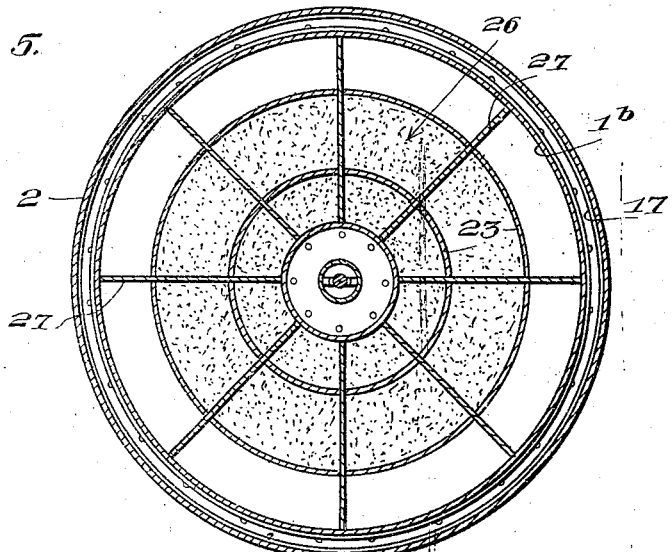
Figure 8:
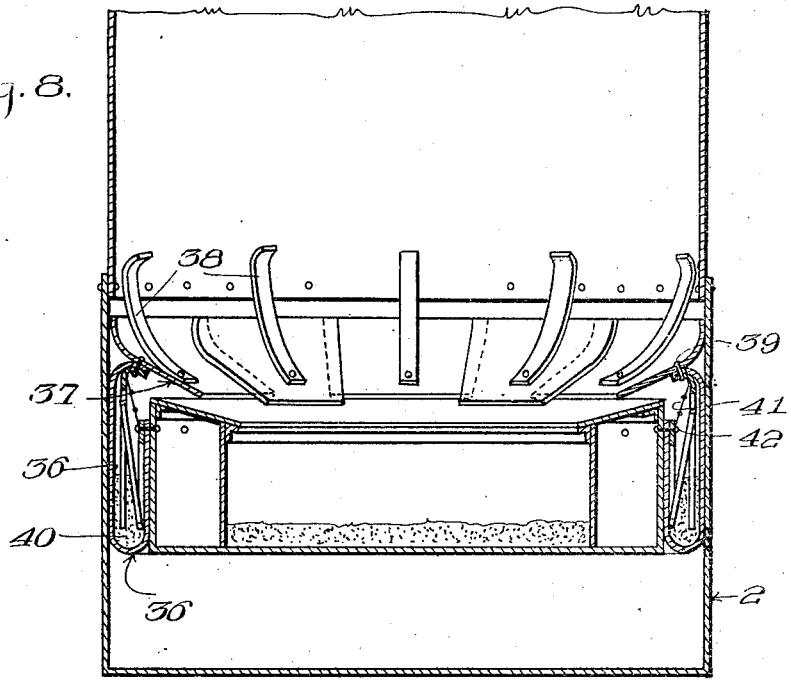
Figure 9:
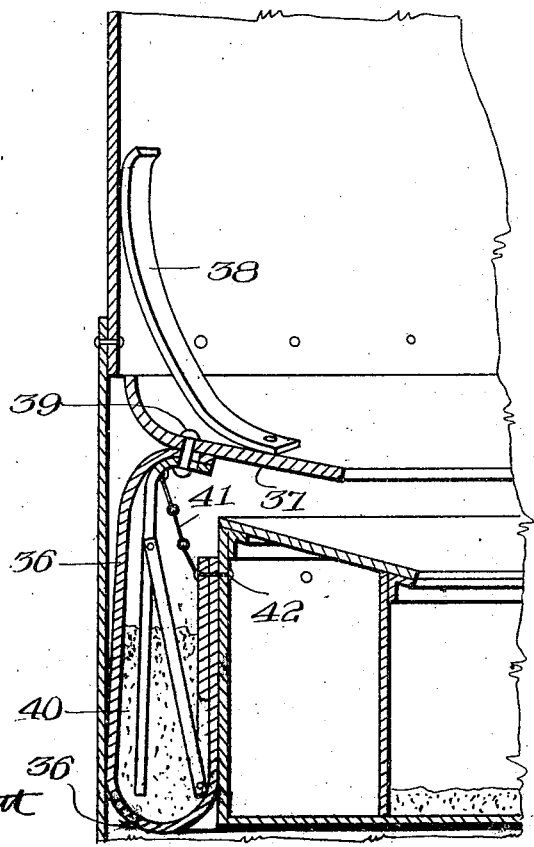

Figure 1 is a vertical section of an improved fire-proof tank, constructed in accordance with my invention, in which the floating tank includes a partition forming an annular dry space, Figure 2 is a plan view of a modified construction of floating tank, in which it is composed of a great number of compartments or tanks suitably secured together, Figure 3 is a detail cross section on the line 3—3 of Figure 2, showing how the tanks are secured together, Figure 4 is a vertical section similar to Figure 1, in which the annular dry space is supplemented by a plurality of concentric partitions with intervening radiating walls, Figure 5 is a horizontal section on the line 5—5 of Figure 4, clearly illustrating the construction just described, Figure 6 is a vertical section illustrating a floating tank with a plurality of compartments of various shapes, Figure 7 is a horizontal section on the line 7—7 of Figure 6, illustrating the compartments mentioned and also showing each to include a surrounding dry space, Figure 8 is a vertical section of an oil container, illustrating a water deflector for the floating tank, with means for disengaging it should parts thereof catch on a projection on the container wall, and Figure 9 is an enlarged section of a portion of the structure in Figure 8, illustrating the mode of operation.

This is a continuation in part of my co-pending application for Letters Patent on fire-proof tanks, filed July 21, 1919, Serial No. 312,188, and relates to the means for so disposing the water falling upon the floating tank that the danger of tipping and consequent disaligning of the tank, is entirely obviated. Generally stated, the invention comprises a tank 1, floating on the surface of the liquid in the outer stationary tank or container 2, with a circular partition 3, defining an annular dry space 4, for the purpose of confining rain water to the center of the floating tank. Since numerous forms of the invention are illustrated, each is described separately.

*The form in Figure 1,* comprises the elements described above, and in addition shows a layer of sand 5, to the depth of approximately 5 or 6 inches, over the whole surface of the floating tank inside of the annular partition 3. The space 4 is kept dry by a hood 6. Angle irons 7 and 8 of suitable formation, provide the mountings to which the respective upper and lower edges of the hood are secured.

A deflector 9 directs water falling into the container 2 to the center of the floating tank 1. This deflector is suitably supported at 10 to an extension 11 of the floating tank.

The extension serves more than the one purpose of supporting the deflector.

A wall 12, secured at the bottom to the extension 11 by means of a fusible substance 13, defines a space, or rather an annular pocket for containing sand 14, or other fire extinguishing material. The bead 15 around the upper edge of the wall 12, is suitably braced at 16 to the extension 11, to hold the upper part of the wall suspended when the lower part is released by virtue of the melting of the fusible substance.

Normally the annular pocket 17, running around the floating tank 1, is empty. Should a fire occur the fusible substance 13 will soon melt and in releasing the lower part of the wall 12 will permit the sand 14 to run out into the annular pocket 17 and so act to extinguish the fire. In certain instances the pocket 17 is either partially or wholly filled with sand, gravel, slag or like material, for the purpose of pressing the free side of the flexible sheet which constitutes the pocket 17, against the wall of the container 2 for the purpose of making a tight joint.

This feature of the invention is fully disclosed in the co-pending application above referred to, and need not be described in detail here. It is sufficient to say that the flexible sheet constituting the pocket 17, is secured at the lower end to the floating tank, the free end extending in contact with the wall of the container 2, substantially as illustrated in Figure 1.

*The form in Figure 2,* shows a floating tank 1ª which is made up of a relatively great number of tanks 18 of any desired shape, these being secured to each other substantially as shown in Figure 3. Here adjacent walls of the tanks are shown close together and with the upper edges curled over at 19 to include the vertical flanges of angle irons 20.

These angle irons brace the upper edges. All parts are secured together either by means of rivets 21 or equivalent securing devices. A plurality of stay bolts, angle irons, or equivalent trussing means 22 span the tank 1ª, the ends being suitably secured on the outer wall. These irons are secured to the various tanks, to afford additional bracing means, particularly for the outermost ones.

The whole purpose of the forms in Figures 1 and 2, as well as the other forms described below, is to keep the rain water which naturally enters the floating tank, from accumulating on one side so as to unbalance the tank. Oil tanks of the type herein disclosed, are very large, usually being 115 feet in diameter. It is easy to see that a floating tank of such large proportions, of necessity will have a certain amount of unevenness in the structure of the bottom and such unevenness makes it easily possible for a greater quantity of water to accumulate at one place than in another. The provision of tanks or compartments prevents any uneven distribution of water.

*The form in Figure 4,* is similar to that in Figure 1, in all respects with the exception of a modified construction in the floating tank 1ᵇ. There is a plurality of circular partitions 23, concentrically arranged as in Figure 5, for the purpose of segregating the water into a number of circular pools. The hood 6, which in the form in Figure 1, defines, or rather produces an annular dry space, may be left out entirely, it being shown merely for the purpose of illustrating its possible use.

Angle irons 24 brace the upper edges of the circular partitions 23. These partitions are additionally braced by means of angle irons 25 on the bottom of the floating tank, to which said partitions are secured. Layers of sand 26, are placed in the various circular compartments.

The object of using sand, as in Figures 1 and 4, must be made clear. The presence of water in the sand, keeping it damp to a greater or less extent, provides a cooling medium for the oil beneath. It must also be pointed out that the surface of the floating tank 1ᵇ, may be further subdivided by providing radiating partitions 27 as in Figure 5, which divide the circular compartment into series of smaller compartments, approximating the arrangement in Figure 2.

*The form in Figure 6,* comprises a floating tank 1ᶜ, with a deflector 28 for directing rain water towards the middle of the tank. The upper edge 29 of the deflector contacts the container 2 and aids in making a joint between the moving and stationary tanks.

There is also an annular sheet 30 near the bottom of the floating tank, secured and disposed on the order of the annular pocket 17 in Figure 1, for the purpose of forming a joint either by its mere contacting the wall of the container, or with the aid of a layer of sand therein.

It is more important, however, to observe the construction of the compartments 31. These are of very peculiar shape as shown in Figure 7. They may be made of any shape whatever so long as a floating tank with an outer circular wall results.

The inner contacting walls of the partitions themselves are secured together by any suitable means, angle irons 32 being employed to brace the upper edges, and vertical angle irons 33 being fixed at various places to brace the walls. The furnishing of each compartment, or section 31, is such as to include a dry channel 34. Such channel can of course be kept dry only by means of a roof or covering of some kind.

Such a roof is shown at 35 in Figure 6. It slopes toward the center of the compartment 31 so that water may collect there. Similar roofs are shown in connection with the other compartments.

*The form in Figure 8,* illustrates an annular joint-forming pocket 36, similar to 17 in Figure 1, with its upper end curled inwardly sufficiently far to provide a mounting for a deflector 37 corresponding to 9 in Figures 1 and 4. The deflector is now composed of a plurality of plates in overlapping arrangement.

Each has an arm 38 secured thereto. The upper ends of the arms have pronounced curves so as to avoid all likelihood of catching on projections from the container wall. The upper part of the deflector 37 is also curved but it is found that the upper edge of the deflector can catch on projections from the container wall, as for example the rivets along a seam.

Consider Figures 8 and 9. Should the upper edge of the deflector 37 get caught on a seam of the container 2, there will be a tendency for the inner edge to rise as indicated by the arrow in Figure 8, the loose rivet connection 39 acting as a pivot. This movement causes the arm 38 to move outwardly into contact with the wall of the container and produce a pushing action on the deflector 37, resulting in the slight flexing of the sheet 36, which forms the pocket, and the consequent disengagement of the formerly caught edge of the deflector.

Sand 40 fills the pocket 36 to the required depth so as to press the free side of the flexible sheet against the outer container wall, a flexible connection 41 being employed to restrain the upper part of the pocket when the floating tank is either removed from the container or rises such a distance therein that the upper part of the floating tank projects above the container wall. The connection 41 runs from the place of attachment 42 of the flexible sheet, to a suitable point above, substantially as shown in Figure 9. It is here to be noted that the flexible sheet 36 is secured at a place relatively high up on the wall of the floating tank, rather than near the bottom as in some of the preceding forms. The likelihood of leaks occurring through the rivet holes is thereby materially lessened.

While the construction and arrangement of the fire-proof tank as herein described and claimed, is that of a generally preferred form, obviously modifications and changes can be made without departing from the spirit of the invention or the scope of the claims.

I claim:—

1. The combination of a container, a floating tank covering the liquid in the container, and a deflector carried by the floating tank and contacting the container wall, for preventing water reaching the space between said tank and container.

2. The combination of a container, a floating tank covering the liquid in the container, joint-forming means between the tank and container wall, and means carried by the floating tank but disposed above said joint-forming means for keeping foreign substances from falling into said joint-forming means and deflecting them toward the center of the tank.

3. A fire-proof tank, comprising a container, and a cover for the surface of the liquid in the container, composed of a plurality of compartments, for receiving water falling upon the cover and preventing an uneven distribution of said water.

4. A fire-proof tank, comprising a container, a floating tank on the surface of the liquid in the container, with a plurality of partitions defining receptacles on the floating tank, and means embodied in the floating tank for directing water into certain of said receptacles for ballast, leaving others of the receptacles dry.

5. A fire-proof tank, comprising a container, a cover on the surface of the liquid in the container, suitably shaped compartments constructed on the cover, means covering certain of said compartments forming dry spaces, and means for deflecting water over said coverings into others of said compartments.

6. A fire-proof tank, comprising a container, a cover on the surface of the liquid in the container, suitably shaped compartments constructed on the cover, means covering certain of said compartments forming dry spaces, and layers of sand placed in said compartments, providing a medium checking the conduction of heat to the liquid in the container.

7. A fire-proof tank, comprising a container, a cover on the surface of the liquid in the container, means around the cover providing a flexible joint therebetween and the wall of the container to prevent evaporation, and a layer of cooling substance on the cover, including sand.

8. A fire-proof tank, comprising a container, a floating tank on the surface of the liquid in the container, partitions forming a plurality of tanks and means by which they are suitably braced, constituting said floating tank; means between the floating tank and container forming a joint to prevent evaporation, layers of sand in said compartments to aid in keeping said liquid cool, means covering certain of the compartments to provide dry spaces, and means carried by part of the floating tank to deflect water into said compartments and aid in making a joint between the floating tank and container.

9. A fire-proof tank, comprising a storage tank, a floating tank with an annular flexible pocket engaging the storage tank, and means mounted on the floating tank normally carrying a fire-extinguishing substance, including fusible holding means adapted to be mounted to release said substance.

10. A floating cover for oil containers, having partitions composing open tanks, and means for bracing the edges of the tanks.

11. A container, a cover on the liquid therein composed of a plurality of compartments, means which deflects water in respect to the container and the cover, and means which deflects water in respect to the cover and said compartments.

12. A tank comprising a liquid container, a float adapted to be supported on the surface of the liquid, a deflector so disposed as to cover the space between the float and container walls and thereby direct foreign substances from said space toward the center of the float, the deflector including a portion which is slidable along the container wall surface, and means upon which the deflector is mounted to be carried by the float.

13. A tank comprising a liquid container, a float adapted to be supported on the surface of the liquid, a deflector so disposed as to cover the space between the float and container walls and thereby direct foreign substances from said space toward the center of the float, the deflector including a portion which is slidable along the container wall surface, means upon which the deflector is mounted to be carried by the float, and means carried by the float defining compartments into which the deflector is adapted to direct water falling thereupon.

WILSON SYLVESTER HUFF.